United States Patent [19]

Plainer et al.

[11] Patent Number: 4,684,525

[45] Date of Patent: Aug. 4, 1987

[54] METHOD FOR MAKING BEER

[75] Inventors: Hermann Plainer, Reinheim; Bruno Sproessler; Helmut Uhlig, both of Rossdorf, all of Fed. Rep. of Germany

[73] Assignee: Röhm GmbH, Darmstadt, Fed. Rep. of Germany

[21] Appl. No.: 896,856

[22] Filed: Aug. 14, 1986

[30] Foreign Application Priority Data

Aug. 22, 1985 [DE] Fed. Rep. of Germany ....... 3530009

[51] Int. Cl.$^4$ .............................................. C12C 11/04
[52] U.S. Cl. ....................................... 426/16; 426/592
[58] Field of Search ....................... 426/11, 16, 28, 29, 426/592, 600

[56] References Cited

U.S. PATENT DOCUMENTS 3,713,840  1/1973  Quitterton ............................ 426/29
4,092,434  5/1978  Yoshizumi ............................ 426/29

FOREIGN PATENT DOCUMENTS 1421955  1/1976  United Kingdom .................. 426/11

OTHER PUBLICATIONS

Industrial Enzymology, T. Godfrey et al., MacMillan, Byfleet, Surrey, U.K. (1983) 252–257.
Ullmann, Enzyklopaedie der Technischen Chemie, vol. 8, 1974, pp. 490–491.

Primary Examiner—Raymond N. Jones
Assistant Examiner—Marianne M. Cintins
Attorney, Agent, or Firm—Curtis, Morris & Safford

[57] ABSTRACT

A method for making beer is disclosed wherein an amyloglucosidase enzyme from a Rhizopus culture is added to a wort and, after the enzyme has acted, the enzyme is inactivated under pasteurizing conditions.

8 Claims, No Drawings

METHOD FOR MAKING BEER

METHOD FOR MAKING BEER

The present invention relates to a method for making beer and relates particularly to a method for making beer having a carbohydrate content less than 2 percent by weight.

STATE OF THE ART

In the conventional manufacture of beer, the wort is thoroughly fermented with yeast and the beer so obtained is pasteurized. "Pasteurization" is to be understood as the killing of germs by heating at 60° C. for about 20 minutes or at 70° C. for 5 to 20 seconds (cf. Ullmann, *Enzyklopaedie der Technischen Chemie* ("*Encyclopedia of Technical Chemistry*"), Vol. 8, 1974, pp. 490–491). The beer usually contains about 3 to 4 percent of unfermented residual carbohydrates.

In the preparation of beer for diabetics or as a food low in nourishment, a residual carbohydrate content of less than 2 percent, and preferably below 1 percent, must be reached by a higher degree of fermentation. Such an extensive fermentation presupposes a corresponding extensive conversion into sugars of the polysaccharides, above all dextrins, still present in the wort. For this purpose, amyloglucosidases from *Aspergillus niger* cultures are added. Carbohydrates, particularly dextrins, which make up the unfermented residue, are important for foam stabilization and organoleptic properties and must be preserved during lagering. To prevent their further decomposition, the added amyloglucosidases must be inactivated. Since amyloglucosidases from *Asp. niger* are not completely inactivated under the conditions of pasteurization, the beer must be heated to above 80° C., a process which requires special production equipment. In order to avoid the energy consumption which is necessary for such treatment, fungal beta-amylases have heretofore been added, which, to be sure, are inactivated by conventional pasteurization but require a longer treatment time when beer is prepared with them. See, for instance, T. Godfrey et al., *Industrial Enzymology—The Application of Enzymes in Industry*, McMillan Publishers, The Nature Press, 1983, pp. 252–254.

THE OBJECT OF THE INVENTION AND SOLUTION

The object of the invention is the improvement of the manufacture of beer of reduced carbohydrate content so that conventional pasteurization is sufficient for inactivation of the enzymes which are added and residual dextrins are preserved.

It has been found that this object is achieved by a method for making beer involving the addition of an amyloglucosidase to the wort and inactivation of the amyloglucosidase by heating after conclusion of the treatment time by using an amyloglucosidase from a Rhizopus culture. Surprisingly, this enzyme is inactivated in beer even under pasteurization conditions, although in an aqueous starch solution the enzyme reaches its activity optimum first at a temperature of 55°–60° C. and still exhibits a long-acting activity at temperatures above 60° C.

ADVANTAGES OF THE INVENTION

Rhizopus amyloglucosidase has a rate of cleavage of polysaccharides contained in the wort which is comparable with an *Asp. niger* amyloglucosidase, but is inactivated under conventional pasteurization conditions to a residual activity of at most 1 percent of its initial activity. In this way, energy costs are saved.

PERFORMANCE OF THE INVENTION

Preferably, 1 to 100 g of commercially available Rhizopus glucamylase having an activity, for example, of 200 glucamylase units (GAU) per gram are added to the wort per hectoliter of beer prior to pitching. Enzyme action can occur during first- and post-fermentation and, thus, takes place in a temperature region from 0° C. to 20° C. according to the kind of beer involved.

The residual carbohydrate content decreases during this process to less than 2 percent. The enzyme still present in the beer is inactivated by a simple pasteurization, such as is carried out with most beers. This occurs at the end of the brewing process at temperatures between 60° C. and 75° C. within 5 seconds to 60 minutes, whereby the heating time can be shorter the higher the temperature. Pasteurization is preferably carried out in a heat exchanger. If desired, pasteurization can also be carried out in bottles after filling.

The following tests illustrate that Rhizopus amyglucosidase can be inactivated under pasteurization conditions but *Asp. niger* amyloglucosidase cannot. The tests are carried out in a finished beer of low carbohydrate content so that the conditions present at the beginning of the test agree completely with the last phase of the brewing process.

To each liter of commercially available low-carbohydrate beer (Maisel's Edeltropfen Diaet-Pilsner, Bayreuth, West Germany, having 0.6 percent of detectable residual carbohydrate) are added:

(a) 50 mg of amyloglucosidase "Novo 200", an *Asp. niger* amyloglucosidase manufactured by Novo, Denmark having an activity of 200 GAU/g, and (b) 10 mg of "New Sumyzyme", a Rhizopus amyloglucosidase manufactured by Sumitomo Shoji Kaisha, Ltd. having an activity of 1000 GAU/g.

The two solutions were subdivided into portions and the portions were pasteurized under different conditions as shown in the following Table. Subsequently, the residual acitivity of the enzyme was detected by incubation in 20 percent maltodextrin solutions (pH=4.5, 40° C., 60 minutes).

| Pasteurization at 60° C.; Residual Activity in % | | | | |
|---|---|---|---|---|
| | Treatment Time | | | |
| | 10 min. | 20 min. | 30 min. | 60 min. |
| Asp. niger Glucamylase | 85% | 70% | 55% | 43% |
| Rhizopus Glucamylase | 19% | 2% | 0.8% | 0% |

| Pasteurization at 70° C., Residual Activity in % | | | | |
|---|---|---|---|---|
| Treatment | 10 sec. | 20 sec. | 30 sec. | 60 sec. |
| Asp. niger Glucamylase | 75% | 66% | 58% | 45% |
| Rhizopus Glucamylase | 0.8% | 0% | 0% | 0% |

| Pasteurization at 74° C.: Residual Activity in % | | | | |
|---|---|---|---|---|
| | Treatment Time | | | |
| | 10 sec. | 20 sec. | 30 sec. | 60 sec. |
| Asp. niger Glucamylase | 49% | 37% | 29% | 17% |
| Rhizopus Glucamylase | 0% | 0% | 0% | 0% |

Normally, amyloglucosidase preparations produced from Rhizopus cultures comprise relatively large amounts of protease side activity. The storage stability of liquid preparations of this type has proved to be unsatisfactory. Furthermore, the foam of beers prepared with Rhizopus enzymes is not as stable as desired.

It is supposed that these disadvantages are caused by the protease side activity since they may be avoided by use of a Rhizopus preparation free of or poor in protease. Therefore, the process of the invention is preferably performed using a Rhizopus preparation having a amyloglucosidase/protease ratio of more than 1 GAU/UHB. These preparations may be produced in liquid form and are long-term storable. In contrast to powder preparations, the liquid preparations according to the invention are free of dusting and are easily and exactly measurable. The foam stability of the beer produced with amyloglucosidase having low protease content is clearly improved.

Preferred amyloglucosidase preparations for use in the process of the invention are those which contain little or no protease in their original culture broth. Such broths may be obtained by careful selection of strains and by use of culture media of no protein content. Suitable strains may obtained by mutation and screening for low protease content.

The protease content of Rhizopus enzymes may be reduced subsequent to their isolation in known manner such as fractionated precipitation, selective inactivation or affinity chromatographic procedures. Proteases are selectively inactivated, e.g. by treatment of the amyloglucosidase solution at a pH value of more than 6, preferably of 7 to 8, resulting in an enzyme product having superior properties when used in the process of the invention. The amyloglucosidase preparation is preferably heated to a temperature above 30° C., e.g. to 40° to 70° C., for some time, e.g. for five minutes, during said treatment. The lower the temperature within this region, the longer should be the duration of this treatment, optionally up to 24 hours. The protease content decreases rapidly during this treatment, while the amyloglucosidase is surprisingly stable. After the inactivation step, the pH value may be lowered again, if desired. The stability of the amyloglucosidase is improved by the presence of organic polyhydroxy compounds during the inactivation procedure. Preferred polyhydroxy compounds comprise one OH group per 1 or 2 carbon atoms and have a molecular weight of less than 10.000, such as glycerol, ethylene glycol, glucose, sorbitol, invert sugar, galactose, or dextrins. 5 to 90 percent by weight of the polyhydroxy compounds, calculated on the dry weight of the enzyme preparation, may be present. These stabilizing agents, especially glycerol, prevent the enzyme solution from microbial contamination, so they may be used as such in the process of the invention. For the same purpose, salts may be added, e.g. 1 to 10 percent by weight of the enzyme solution, of salts such as sodium chloride, potassium chloride, ammonium sulfate or magnesium sulfate.

A better understanding of the invention and its advantages will be had from the following Examples.

EXAMPLE 1

An all-malt wort is prepared in the usual manner and adjusted to a solids content of 8.5 percent by weight by the addition of water. 12.5 g of a liquid glucosidase preparation prepared from Rhizopus oryzae and having a glucosidase activity of 120 GAU/g are added per 100 liters of this wort. The added activity thus is about 1500 GAU/100 l of wort.

Fermentation proceeds at about 15° C. After fermentation and post-fermentation, the beer is filtered and pasteurized at 74° C. for 10 seconds in a tubular laboratory heat exchanger, bottled, and allowed to stand for 8 weeks.

Thereafter, analysis of the total residual carbohydrate content is 1.1 percent by weight. The glucose content is only 0.03 percent by weight, indicating little conversion of residual dextrins to sugars.

For comparison, 6.7 g of a liquid amyloglucosidase preparation from Asp. niger (225 GAU/g) are added to 100 liters of the same wort. After fermentation, filtering, pasteurization, bottling, and storage for 8 weeks as before, analysis shows 1.1 percent by weight of residual carbohydrate, but a glucose content of 0.5 percent by weight, indicating incomplete inactivation of the enzyme during pasteurization with resultant decomposition of residual dextrins.

EXAMPLES 2 TO 5

From mutated strains of Rhizopus oryzae, screened for low protease production, powders were prepared by precipitation with alcohol. They were mixed with a sugar or glycerol and water was added. The suspensions were stirred to form clear solutions. For the inactivation of the protease, the pH of the solutions was raised by addition of alkali (5 n aqueous NaOH). Some of the solutions were warmed for several hours. Details are given in Tables 1 and 2.

EXAMPLE 6

A commercial Rhizopus amyloglucosidase (AMG), "New Sumyzyme" from Sumitomo Shoji Kaisha, Ltd., was used and treated in the above manner to inactivate the protease activity.

EXAMPLE 7

(Comparison)

The method of Example 5 is repeated, but the inactivation procedure by alkali treatment is omitted.

For conditions and results of Examples 1 to 7 see Tables 1 and 2.

Results:

1. The alkali treatment in aqueous solutions containing a polyhydroxy compound drastically inactivates the protease side activity, while the AMG-activity is retained. The factor f=GAU/g: mUHB/mg was calculated, a high value f demonstrating a low protease content. Without the alkali treatment (Example 7), the protease activity remains high and f is low (f=1.6).

2. The alkali treatment of liquid Rhizopus AMG gives food storage stability: After 5 months at room temperature the AMG activity-loss was less than 10%.

In contrast, the activity loss was high if the alkali treatment was omitted.

3. All Rhizopus preparations having reduced protease side activity result in a good foam stability of the low calorie beer made thereof. In contrast, a poor foam stability was found, if Rhizopus AMG having considerable protease side activity was used (Example 7).

TABLE 1

Preparation of Liquid Rhizopus-AMG

| | activity of powder product | | | composition of liquid product | | | |
|---|---|---|---|---|---|---|---|
| | GAU/g[1] | mUHB/mg[2] | f | % water | % water | % polyhydroxy compound | conditions of protease inactivation procedure |
| Example Nr. | | | | | | | |
| 2 | 380 | 108 | 3.52 | 33 | 30 | 37 glycerol | pH = 7.0, 50° C., 1 h |
| 3 | 1004 | 612 | 1.64 | 21 | 20 | 59 glycerol | pH = 7.5, 55° C., 3 h |
| 4 | 1004 | 612 | 1.64 | 21 | 25 | 48 glycerol + 4 sorbitol + 2 sodium chloride | pH = 8, 25° C. |
| 5 | 1004 | 612 | 1.64 | 21 | 30 | 44 glycerol + 5 malto-dextrine | pH = 7.5, 58° C., 1 h then pH = 5 again |
| 6 | 631 | 722 | 0.89 | 27 | 36 | 37 glucose | pH = 7.5, 55° C., 8 h |
| Comparison Example | | | | | | | |
| 7 | 1004 | 612 | 1.64 | 21 | 30 | 44 glycerol + 5 malto-dextrine | no alkali-treatment |

[1] GAU/g = Glucamylase units per gram of enzyme product. 1 GAU will produce 1 μmol of glucose per minute at 30 degrees C. in a 1 percent b.w. maltose solution of pH 4.3.
[2] UHB/mg = Proteinase units per milligram of enzyme product. 1 UHB are defined as releasing trichloracetic acid-soluble fractions from hemoglobin equivalent to 1 micromole tyrosine per minute at 37 degrees C. and pH 5 (standard conditions); 1000 mUHB = 1 UHB.

TABLE 2

Properties of Liquid Rhizopus-AMG

| | activity of liquid product | | | % activity loss during treatment | | AMG-activity after storage 5 month 25° C. | | foam stability of low calory beer made thereof[3] |
|---|---|---|---|---|---|---|---|---|
| | GAU/g | mUHB/mg | f | AMG | protease | GAU/g | % less | |
| Example No. | | | | | | | | |
| 2 | 119.7 | 7.3 | 16.4 | −4.5% | −75% | 114.5 | −4.6% | + |
| 3 | 193.3 | 11.2 | 17.2 | −8.3% | −91.3% | 190.8 | −1.8% | + |
| 4 | 200.3 | 19.5 | 10.3 | −5% | −84.8% | 185.3 | −7.5% | + |
| 5 | 196.0 | 10.3 | 19.0 | −7% | −92% | 190 | −3.1% | + |
| 6 | 133.7 | 7.8 | 17.1 | −21.5% | −96.1% | 128 | −4.2% | + |
| Comparison Example | | | | | | | | |
| 7 | 208.5 | 127.5 | 1.6 | −1.1 | −0.8% | 130.6 | −37.4% | − |

"+" indicates satisfactory foam stability;
"−" indicates unsatisfactory foam stability.

What is claimed is:

1. A method for making a low calorie beer which comprises adding to a wort from 2 to 200 glucamylase units, per liter of wort, of an amyloglucosidase from a Rhizopus culture, said amyloglucosidase having a protease content therein and having been heated above 30° C. at a pH greater than 6 until the ratio of amyloglucosidase to protease therein is greater than one glucamylase unit per protease unit, fermenting said wort with yeast to produce beer whereby the carbohydrate content of said wort is reduced, and, after the carbohydrate content has been reduced to less than 2 percent, inactivating the amyloglucosidase under pasteurizing conditions by heating at 60° C. to 75° C. for five seconds to one hour.

2. A method as in claim 1 wherein said inactivation takes place after fermentation.

3. A method as in claim 1 wherein said inactivation takes place while the beer flows through a heat exchanger.

4. A method as in claim 1 wherein said amyloglucosidase is present in a liquid enzyme preparation.

5. A method as in claim 4 wherein said liquid enzyme preparation has a pH greater than 6.

6. A method as in claim 1 wherein said amyloglucosidase has been heated above 30° C. in the presence of alkali.

7. A method as in claim 1 wherein said amyloglucosidase is added in a preparation additionally comprising from 5 to 90 percent, by dry weight of the preparation, of a polyhydroxy compound.

8. A method as in claim 7 wherein said amyloglucosidase has been heated above 30° C. in the presence of said polyhydroxy compound.

* * * * *

UNITED STATES PATENT AND TRADEMARK OFFICE
CERTIFICATE OF CORRECTION

PATENT NO. : 4,684,525
DATED : August 4, 1987
INVENTOR(S) : Plainer et al.

It is certified that error appears in the above-identified patent and that said Letters Patent is hereby corrected as shown below:

Columns 5 - 6, TABLE 1, in the lowermost line of headings, replace the first (left-hand-most) occurrence of "% water" by -- % enzyme --.

Signed and Sealed this

Ninth Day of April, 1991

Attest:

HARRY F. MANBECK, JR.

*Attesting Officer*    *Commissioner of Patents and Trademarks*